(12) United States Patent
Ben-Chen et al.

(10) Patent No.: US 9,998,573 B2
(45) Date of Patent: Jun. 12, 2018

(54) HARDWARE-BASED PACKET PROCESSING CIRCUITRY

(71) Applicant: QUALCOMM Incorporated, San Diego, CA (US)

(72) Inventors: Tomer Rafael Ben-Chen, Amikan (IL); Amit Gil, Zichron Yaakov (IL); Dan Gilboa Waizman, Atlit (IL); Deepak Jindal, Bangalore (IN); Ayala Miller, Haifa (IL); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 15/226,429

(22) Filed: Aug. 2, 2016

(65) Prior Publication Data

US 2018/0041614 A1 Feb. 8, 2018

(51) Int. Cl.
*H04L 12/28* (2006.01)
*H04L 29/06* (2006.01)
*H04L 12/741* (2013.01)
*H04L 12/749* (2013.01)

(52) U.S. Cl.
CPC ............ *H04L 69/22* (2013.01); *H04L 45/741* (2013.01); *H04L 45/745* (2013.01); *H04L 69/04* (2013.01); *H04L 69/08* (2013.01)

(58) Field of Classification Search
None
See application file for complete search history.

(56) References Cited

U.S. PATENT DOCUMENTS

| 6,246,683 B1 | 6/2001 | Connery et al. |
| 7,239,645 B2 | 7/2007 | Suri et al. |
| 8,631,140 B2 | 1/2014 | Boucher et al. |
| 9,014,003 B2 | 4/2015 | Song et al. |

(Continued)

OTHER PUBLICATIONS

International Search Report and Written Opinion for PCT/US2017/043505, dated Oct. 5, 2017, 13 pages.

*Primary Examiner* — Otis L Thompson, Jr.
(74) *Attorney, Agent, or Firm* — Withrow & Terranova, PLLC

(57) ABSTRACT

Hardware-based packet processing circuitry is provided. In this regard, hardware-based packet processing circuitry includes header processing circuitry and payload processing circuitry. The hardware-based packet processing circuitry receives a header portion and a payload portion of an incoming packet in a first packet format. The header processing circuitry and the payload processing circuitry process the header portion and the payload portion to form a processed header portion and a processed payload portion, respectively. The hardware-based packet processing circuitry generates an outgoing packet in a second packet format based on the processed header portion and the processed payload portion. By processing the incoming packet separately in the header processing circuitry and the payload processing circuitry, it is possible to accelerate selected steps (e.g., ciphering/deciphering, compression/decompression, checksum, etc.) of packet processing via dedicated hardware functional block(s), thus reducing computing resource requirement and overhead associated with software-based packet processing.

30 Claims, 8 Drawing Sheets

(56) References Cited

U.S. PATENT DOCUMENTS

| | | | |
|---|---|---|---|
| 2005/0169303 A1* | 8/2005 | Toma | H04N 7/52 370/466 |
| 2006/0072563 A1 | 4/2006 | Regnier et al. | |
| 2006/0215648 A1 | 9/2006 | Jen | |
| 2008/0081553 A1* | 4/2008 | Kanda | H04W 88/085 455/7 |
| 2011/0268119 A1 | 11/2011 | Pong et al. | |
| 2014/0022993 A1* | 1/2014 | Jacobs | H04L 69/08 370/328 |
| 2015/0172198 A1 | 6/2015 | Levy et al. | |
| 2017/0064047 A1* | 3/2017 | Bosshart | H04L 69/22 |
| 2017/0163538 A1* | 6/2017 | Feng | H04L 45/24 |
| 2018/0034790 A1* | 2/2018 | Mundra | H04L 63/0485 |
| 2018/0041431 A1* | 2/2018 | Yifrach | H04L 45/306 |

\* cited by examiner

HARDWARE-BASED PACKET PROCESSING CIRCUITRY

BACKGROUND

I. Field of the Disclosure

The technology of the disclosure relates generally to packet processing in an electronic device.

II. Background

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Mobile communication devices are increasingly capable of providing a variety of communication services based on a variety of communication protocols. For example, mobile communication devices are often configured to provide wide-area wireless communication services (e.g., long-term evolution (LTE)), local-area wireless communication services (e.g., Wi-Fi), and local-area wired communication services (e.g., Ethernet).

Internet Protocol (IP) is a data communication protocol created by the Internet Engineering Task Force (IETF) for providing a common data transport mechanism across the variety of communication protocols (e.g., LTE communication protocol, Wi-Fi communication protocol, and Ethernet communication protocol). In this regard, application-specific data are first encoded into IP packets before being communicated based on communication protocols corresponding to the variety of communication services. IP packet processing is a heavy task and usually requires dedicated hardware and/or software support in the mobile communication devices. As such, it is desired to optimize efficiency of dedicated IP packet processing hardware, thus achieving increased data throughput, decreased processing latency, and reduced power consumption in the mobile communication devices.

SUMMARY OF THE DISCLOSURE

Aspects disclosed in the detailed description include hardware-based packet processing circuitry. In this regard, hardware-based packet processing circuitry includes header processing circuitry and payload processing circuitry. The hardware-based packet processing circuitry receives a header portion and a payload portion of an incoming packet in a first packet format. The header processing circuitry and the payload processing circuitry process the header portion and the payload portion to form a processed header portion and a processed payload portion, respectively. The hardware-based packet processing circuitry generates an outgoing packet in a second packet format based on the processed header portion and the processed payload portion. By processing the incoming packet separately in the header processing circuitry and the payload processing circuitry, it is possible to accelerate selected steps (e.g., ciphering/deciphering, compression/de-compression, checksum, etc.) of packet processing via dedicated hardware functional block(s), thus reducing computing resource requirement and overhead associated with software-based packet processing.

In this regard, in one aspect, hardware-based packet processing circuitry is provided. The hardware-based packet processing circuitry includes header processing circuitry including a plurality of first hardware functional blocks configured to perform a plurality of predefined header processing functions, respectively. The hardware-based packet processing circuitry also includes payload processing circuitry including a plurality of second hardware functional blocks configured to perform a plurality of predefined payload processing functions, respectively. The hardware-based packet processing circuitry is configured to receive a header portion and a payload portion of an incoming packet in a first packet format. The hardware-based packet processing circuitry is also configured to process the header portion in one or more selected first hardware functional blocks among the plurality of first hardware functional blocks according to a specified header processing sequence to form a processed header portion. The hardware-based packet processing circuitry is also configured to process the payload portion in one or more selected second hardware functional blocks among the plurality of second hardware functional blocks according to a specified payload processing sequence to form a processed payload portion. The hardware-based packet processing circuitry is also configured to generate an outgoing packet in a second packet format based on the processed header portion and the processed payload portion of the incoming packet.

In another aspect, a means for processing packets is provided. The means for processing the packets includes a means for processing a header including a plurality of first hardware functional blocks configured to perform a plurality of predefined header processing functions, respectively. The means for processing the packets also includes a means for processing a payload including a plurality of second hardware functional blocks configured to perform a plurality of predefined payload processing functions, respectively. The means for processing the packets is configured to receive a header portion and a payload portion of an incoming packet in a first packet format. The means for processing the packets is also configured to process the header portion in one or more selected first hardware functional blocks among the plurality of first hardware functional blocks according to a specified header processing sequence to form a processed header portion. The means for processing the packets is also configured to process the payload portion in one or more selected second hardware functional blocks among the plurality of second hardware functional blocks according to a specified payload processing sequence to form a processed payload portion. The means for processing the packets is also configured to generate an outgoing packet in a second packet format based on the processed header portion and the processed payload portion of the incoming packet.

In another aspect, a method for processing packets is provided. The method includes receiving a header portion and a payload portion of an incoming packet in a first packet format. The method also includes processing the header portion in one or more selected first hardware functional blocks among a plurality of first hardware functional blocks in header processing circuitry according to a specified header processing sequence to form a processed header portion. The method also includes processing the payload portion in one or more selected second hardware functional blocks among a plurality of second hardware functional blocks in payload processing circuitry according to a specified payload processing sequence to form a processed payload portion. The method also includes generating an outgoing packet in a second packet format based on the processed header portion and the processed payload portion of the incoming packet.

In another aspect, an electronic device is provided. The electronic device includes one or more communication circuits configured to communicate one or more communication signals based on respective communication protocols. The electronic device also includes a central processing unit (CPU) configured to process protocol-specific packets associated with the one or more communication signals based on a communication protocol stack. The electronic device also includes hardware-based packet processing circuitry. The hardware-based packet processing circuitry includes header processing circuitry including a plurality of first hardware functional blocks configured to perform a plurality of predefined header processing functions, respectively. The hardware-based packet processing circuitry also includes payload processing circuitry including a plurality of second hardware functional blocks configured to perform a plurality of predefined payload processing functions, respectively. The hardware-based packet processing circuitry is configured to receive a header portion and a payload portion of an incoming packet in a first packet format from a selected packet source among the CPU and the one or more communication circuits. The hardware-based packet processing circuitry is also configured to process the header portion in one or more selected first hardware functional blocks among the plurality of first hardware functional blocks according to a specified header processing sequence to form a processed header portion. The hardware-based packet processing circuitry is also configured to generate metadata related to the processed header portion. The hardware-based packet processing circuitry is also configured to process the payload portion based on the metadata in one or more selected second hardware functional blocks among the plurality of second hardware functional blocks according to a specified payload processing sequence to form a processed payload portion. The hardware-based packet processing circuitry is also configured to generate an outgoing packet in a second packet format based on the processed header portion and the processed payload portion of the incoming packet. The hardware-based packet processing circuitry is also configured to provide the outgoing packet to a selected packet destination among the CPU and the one or more communication circuits.

DETAILED DESCRIPTION

Figure 1:
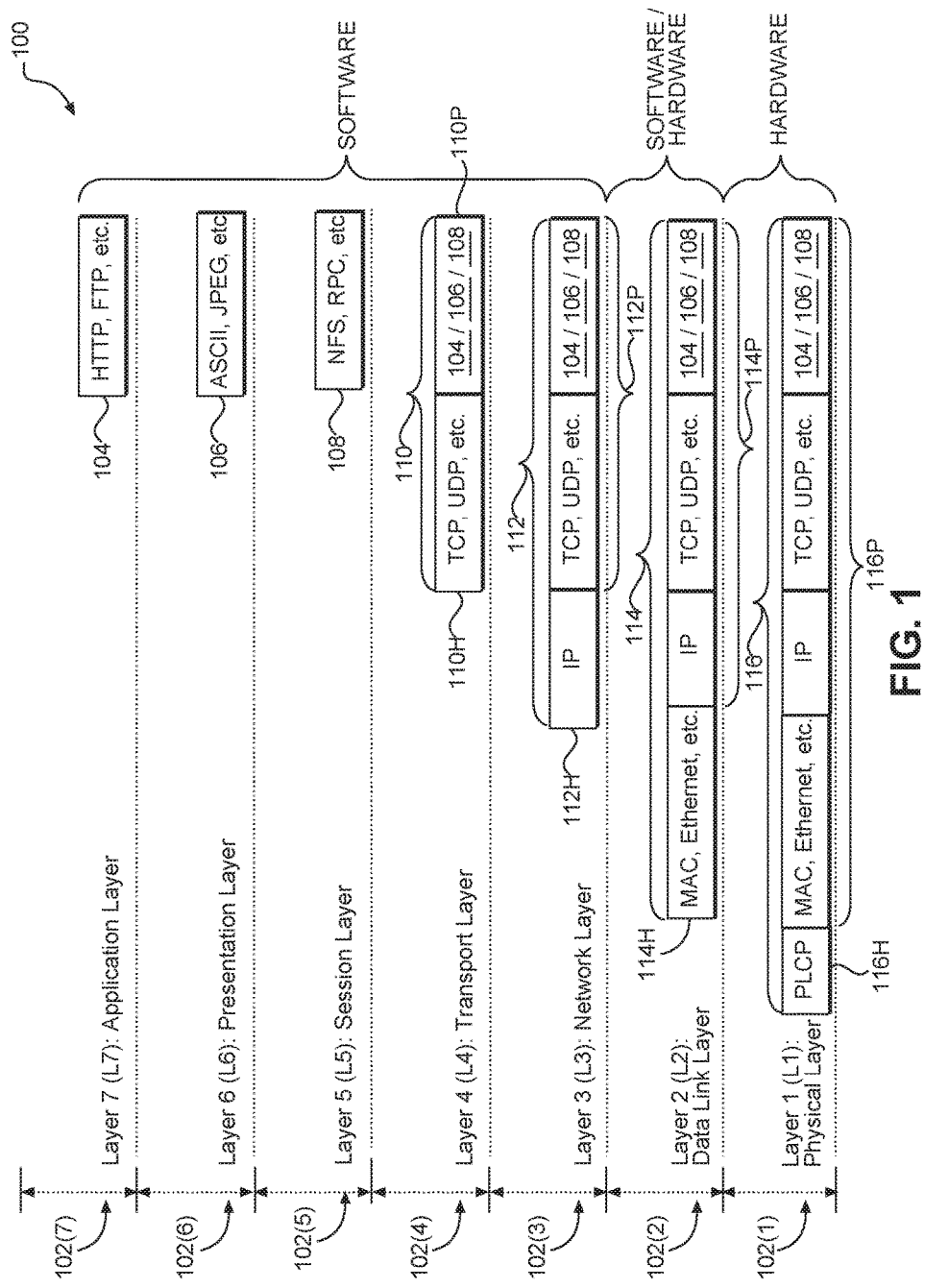
FIG. 1 is a schematic diagram of an exemplary open systems interconnection (OSI) reference model as defined by the International Organization for Standardization (ISO)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include hardware-based packet processing circuitry. In this regard, hardware-based packet processing circuitry includes header processing circuitry and payload processing circuitry. The hardware-based packet processing circuitry receives a header portion and a payload portion of an incoming packet in a first packet format. The header processing circuitry and the payload processing circuitry process the header portion and the payload portion to form a processed header portion and a processed payload portion, respectively. The hardware-based packet processing circuitry generates an outgoing packet in a second packet format based on the processed header portion and the processed payload portion. By processing the incoming packet separately in the header processing circuitry and the payload processing circuitry, it is possible to accelerate selected steps (e.g., ciphering/deciphering, compression/de-compression, checksum, etc.) of packet processing via dedicated hardware functional block(s), thus reducing computing resource requirement and overhead associated with software-based packet processing.

Before discussing exemplary aspects of hardware-based packet processing circuitry that includes specific aspects of the present disclosure, a brief overview of an open systems interconnection (OSI) reference module is first provided in FIG. 1. A brief discussion of software-based packet processing in a conventional electronic device is then provided with reference to FIG. 2. The discussion of specific exemplary aspects of hardware-based packet processing circuitry starts with reference to FIG. 3.

In this regard, FIG. 1 is a schematic diagram of an exemplary OSI reference model 100 as defined by the International Organization for Standardization (ISO). The OSI reference model 100 is a vertical stack including seven (7) layers 102(1)-102(7).

The layer 102(7) is referenced as an application layer, which is commonly referenced as Layer seven (7) and abbreviated as L7. The layer 102(7) is configured to communicate L7 packet 104. The L7 packet 104 is application-specific and may be encoded in Hypertext Transfer Protocol (HTTP) packet format, File Transfer Protocol (FTP) packet format, etc.

The layer 102(6) is referenced as a presentation layer, which is commonly referenced as Layer six (6) and abbreviated as L6. The layer 102(6) is configured to communicate L6 packet 106. The L6 packet 106 is also application-specific and may be encoded in American Standard Code for Information Interchange (ASCII) packet format, Joint Photographic Experts Group (JPEG) packet format, etc.

The layer 102(5) is referenced as a session layer, which is commonly referenced as Layer five (5) and abbreviated as L5. The layer 102(5) is configured to communicate L5 packet 108. The L5 packet 108 is also application-specific and may be encoded in Network File System (NFS) packet format, Remote Procedural Call (RPC) packet format, etc.

The layer 102(4) is referenced as a transport layer, which is commonly referenced as Layer four (4) and abbreviated as L4. The layer 102(4) is configured to communicate L4 packet 110. The L4 packet 110 includes an L4 packet header 110H and an L4 packet payload 110P. The L4 packet header 110H may be encoded in Transport Control Protocol (TCP) packet format, User Datagram Protocol (UDP) packet format, etc. The L4 packet payload 110P is configured to carry the L7 packet 104, the L6 packet 106, and/or the L5 packet 108.

The layer 102(3) is referenced as a network layer, which is commonly referenced as Layer three (3) and abbreviated as L3. The layer 102(3) is configured to communicate L3 packet 112. The L3 packet 112 includes an L3 packet header 112H and an L3 packet payload 112P. The L3 packet header 112H may be encoded in Internet Protocol (IP) packet format, which further includes IP version four (IPv4) packet format and IP version six (IPv6) packet format. The L3 packet payload 112P is configured to carry the L4 packet 110.

The layer 102(2) is referenced as a data link layer, which is commonly referenced as Layer two (2) and abbreviated as L2. The layer 102(2) is configured to communicate L2 packet 114. The L2 packet 114 includes an L2 packet header 114H and an L2 packet payload 114P. The L2 packet header 114H may be encoded in Medium Access Control (MAC) packet format, Ethernet packet format, universal serial bus (USB) packet format, peripheral component interconnect express (PCIe) packet format, etc. The L2 packet payload 114P is configured to carry the L3 packet 112.

The layer 102(1) is referenced as a physical layer, which is commonly referenced as Layer one (1) and abbreviated as L1. The layer 102(1) is configured to communicate L1 packet 116. The L1 packet 116 includes an L1 packet header 116H and an L1 packet payload 116P. The L1 packet header 116H may be encoded in Physical Layer Convergence Protocol (PLCP) packet format. The L1 packet payload 116P is configured to carry the L2 packet 114.

With continuing reference to FIG. 1, in a non-limiting example, the layer 102(1) is implemented in hardware, and the layers 102(3)-102(7) are implemented in software. The layer 102(2) may be implemented in hardware and/or software.

Figure 2:
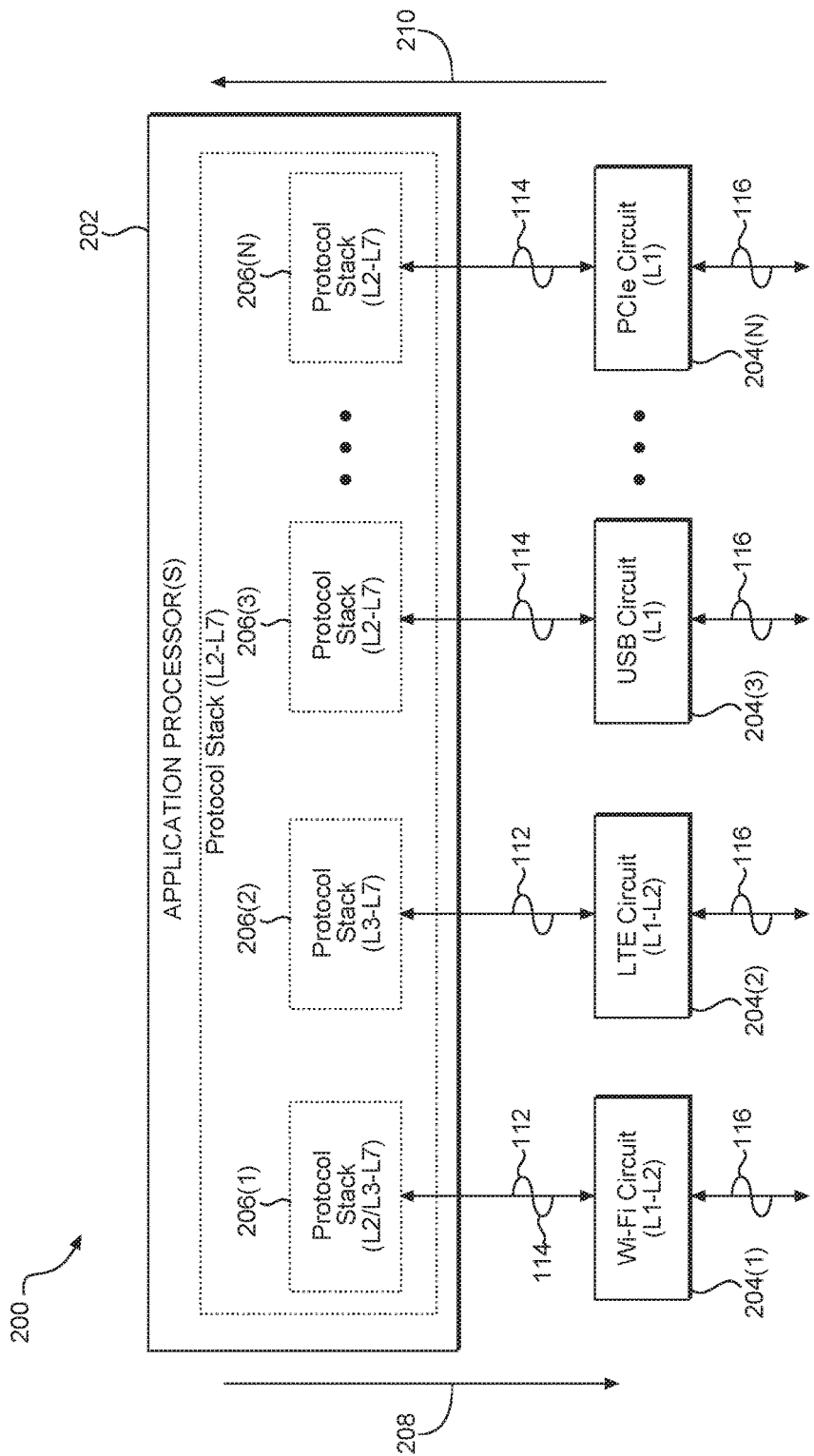
FIG. 2 is a schematic diagram of a conventional electronic device configured to support a software-based packet processing scheme according to the OSI reference model of FIG. 1.

FIG. 2 is a schematic diagram of a conventional electronic device 200 configured to support a software-based packet processing scheme according to the OSI reference model 100 of FIG. 1. Common elements between FIGS. 1 and 2 are shown therein with common element numbers and will not be re-described herein.

The conventional electronic device 200 includes an application processor(s) 202, which may be a central processing unit (CPU) or a microprocessor, for example. The conventional electronic device 200 includes one or more communication circuits 204(1)-204(N). In a non-limiting example, the communication circuit 204(1) is a Wi-Fi circuit 204(1), the communication circuit 204(2) is a long-term evolution (LTE) circuit 204(2), the communication circuit 204(3) is a USB circuit 204(3), and the communication circuit 204(N) is a PCIe circuit 204(N). The application processor(s) 202 is configured to execute one or more software-based protocol stacks 206(1)-206(N) for the communication circuits 204(1)-204(N).

The Wi-Fi circuit 204(1) may be configured to support the layer 102(1) (abbreviated as L1). As such, the Wi-Fi circuit 204(1) is configured to receive the L2 packet 114 in a transmit direction 208. The L2 packet 114 may include the L2 packet header 114H (not shown) encoded in the Ethernet packet format. The Wi-Fi circuit 204(1) converts the L2 packet 114 into the L1 packet 116 by attaching the L1 packet header 116H (not shown) to the L2 packet 114. Likewise, the Wi-Fi circuit 204(1) is configured to receive the L1 packet 116 in a receive direction 210 and convert the L1 packet 116 into the L2 packet 114 by removing the L1 packet header 116H from the L1 packet 116. Accordingly, the software-based protocol stack 206(1) is configured to support the layers 102(2)-102(7) (abbreviated as L2-L7) for processing the L2 packet 114 exchanged with the Wi-Fi circuit 204(1).

The Wi-Fi circuit 204(1) may be further configured to also support the layer 102(2) (abbreviated as L2). As such, the Wi-Fi circuit 204(1) is configured to receive the L3 packet 112 in the transmit direction 208. The L3 packet 112 may include the L3 packet header 112H (not shown) encoded in the IP packet format. The Wi-Fi circuit 204(1) converts the L3 packet 114 into the L1 packet 116 by attaching the L2 packet header 114H and the L1 packet header 116H to the L3 packet 112. Likewise, the Wi-Fi circuit 204(1) is configured to receive the L1 packet 116 in the receive direction 210 and convert the L1 packet 116 into the L3 packet 112 by removing the L1 packet header 116H and the L2 packet header 114H from the L1 packet 116. Accordingly, the software-based protocol stack 206(1) is configured to support the layers 102(3)-102(7) (abbreviated as L3-L7) for processing the L3 packet 112 exchanged with the Wi-Fi circuit 204(1).

The LTE circuit 204(2) may be configured to support the layer 102(1) and the layer 102(2) (abbreviated as L1-L2). As such, the LTE circuit 204(2) is configured to receive the L3 packet 112 in the transmit direction 208. The L3 packet 112 may include the L3 packet header 112H encoded in the IP packet format. The LTE circuit 204(2) converts the L3 packet 112 into the L1 packet 116 by attaching the L2 packet header 114H and the L1 packet header 116H to the L3 packet 112. Likewise, the LTE circuit 204(2) is configured to receive the L1 packet 116 in the receive direction 210 and convert the L1 packet 116 into the L3 packet 112 by removing the L1 packet header 116H and the L2 packet header 114H from the L1 packet 116. Accordingly, the software-based protocol stack 206(2) is configured to support the layers 102(3)-102(7) (abbreviated as L3-L7) for processing the L3 packet 112 exchanged with the LTE circuit 204(2).

The USB circuit 204(3) may be configured to support only the layer 102(1) (abbreviated as L1). As such, the USB circuit 204(3) is configured to receive the L2 packet 114 in the transmit direction 208. The L2 packet 114 may include the L2 packet header 114H encoded in the USB packet format. The USB circuit 204(3) converts the L2 packet 114 into the L1 packet 116 by attaching the L1 packet header 116H to the L2 packet 114. Likewise, the USB circuit 204(3) is configured to receive the L1 packet 116 in the receive direction 210 and convert the L1 packet 116 into the L2 packet 114 by removing the L1 packet header 116H from the L1 packet 116. Accordingly, the software-based protocol stack 206(3) is configured to support the layers 102(2)-102(7) (abbreviated as L2-L7) for processing the L2 packet 114 exchanged with the USB circuit 204(3).

The PCIe circuit 204(N) may be configured to support only the layer 102(1) (abbreviated as L1). As such, the PCIe circuit 204(N) is configured to receive the L2 packet 114 in the transmit direction 208. The L2 packet 114 may include the L2 packet header 114H encoded in the PCIe packet format. The PCIe circuit 204(N) converts the L2 packet 114 into the L1 packet 116 by attaching the L1 packet header 116H to the L2 packet 114. Likewise, the PCIe circuit 204(N) is configured to receive the L1 packet 116 in the receive direction 210 and convert the L1 packet 116 into the L2 packet 114 by removing the L1 packet header 116H from the L1 packet 116. Accordingly, the software-based protocol stack 206(N) is configured to support the layers 102(2)-102(7) (abbreviated as L2-L7) for processing the L2 packet 114 exchanged with the PCIe circuit 204(N).

With continuing reference to FIG. 2, the software-based protocol stacks 206(1)-206(N) are executed at the application processor(s) 202. As such, the application processor(s) 202 needs to execute additional Million Instructions Per Second (MIPS) instructions to carry out the functions of the software-based protocol stacks 206(1)-206(N). As a result, more computing resources of the application processor(s) 202 may be utilized for supporting the software-based protocol stacks 206(1)-206(N), which may lead to degraded performance of the conventional electronic device 200. Further, the software-based protocol stacks 206(1)-206(N) may introduce overhead (e.g., processing delay) when processing the L2 packet 114 and the L3 packet 112. This is especially undesirable when a peak data rate enabled by the communication circuits 204(1)-204(N) is faster than one gigabit per second (1 Gbps). Hence, it is desirable to reduce computing resource requirement and overhead associated with the software-based packet processing scheme in the conventional electronic device 200.

Figure 3:
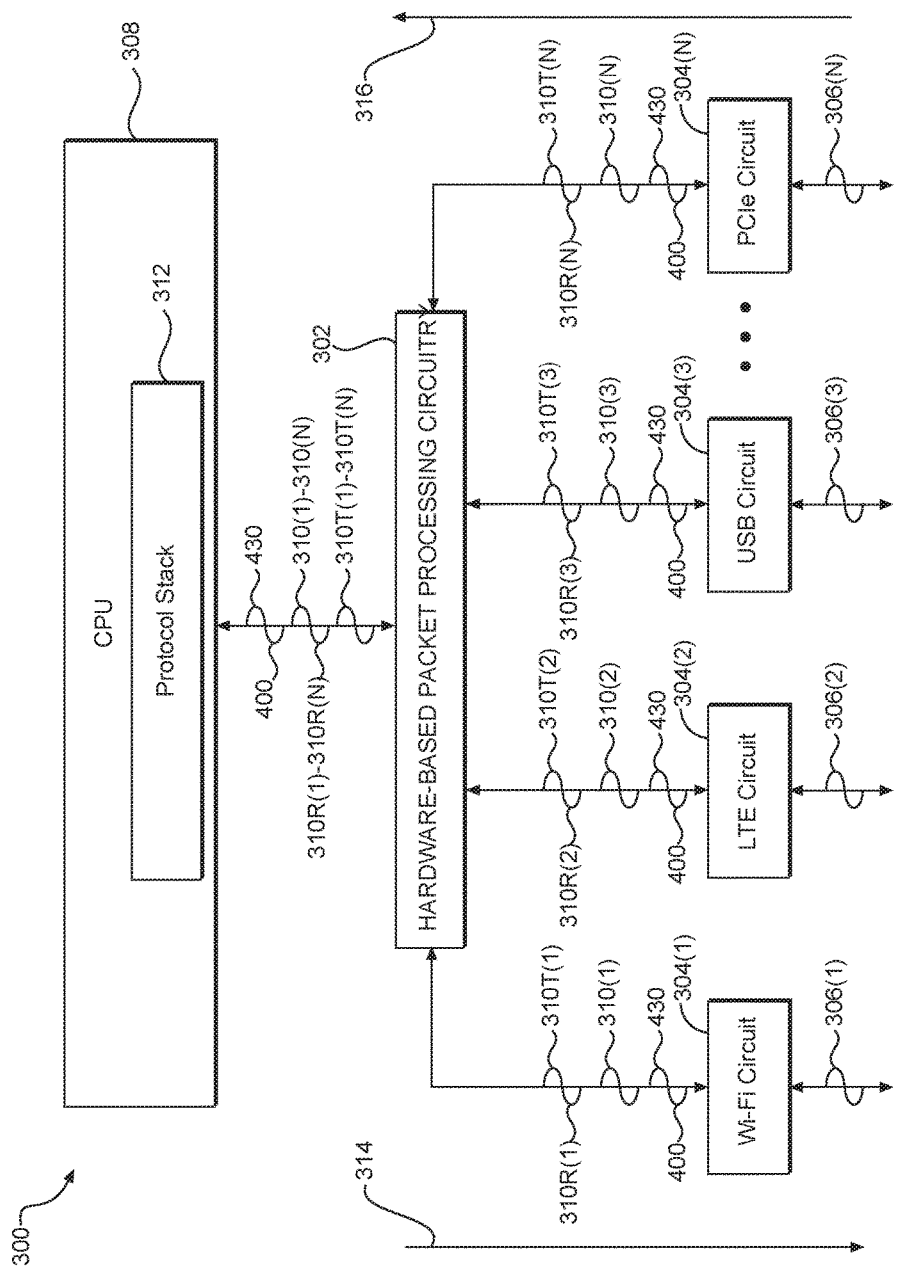
FIG. 3 is a schematic diagram of an exemplary electronic device including hardware-based packet processing circuitry for reducing computing resource requirement and overhead associated with packet processing.

In this regard, FIG. 3 is a schematic diagram of an exemplary electronic device 300 including hardware-based packet processing circuitry 302 for reducing computing resource requirement and overhead associated with packet processing. Common elements between FIGS. 1 and 3 are shown therein with common element numbers and will not be re-described herein. The packet processing discussed hereinafter refers to processing of the L2 packet 114, the L3 packet 112, and the L4 packet 110 of FIG. 1. In a non-limiting example, the hardware-based packet processing circuitry 302 provides a means for processing packets.

With reference to FIG. 3, the electronic device 300 includes one or more communication circuits 304(1)-304(N) configured to communicate one or more communication signals 306(1)-306(N) based on respective communication protocols. The electronic device 300 includes a CPU 308 (e.g., application processor). The CPU 308 is configured to process protocol-specific packets 310(1)-310(N) associated with the communication signals 306(1)-306(N) based on a communication protocol stack 312.

The hardware-based packet processing circuitry 302 is communicatively coupled to the CPU 308 and the communication circuits 304(1)-304(N). In a transmit direction 314, the hardware-based packet processing circuitry 302 receives protocol-specific packets 310T(1)-310T(N) from the CPU 308. The hardware-based packet processing circuitry 302 is configured to process the protocol-specific packets 310T(1)-310T(N) by accelerating selected processing steps (e.g., ciphering, compression, checksum, etc.) via dedicated hardware functional block(s) that are further discussed below in FIG. 4. In this regard, the communication circuits 304(1)-304(N) may not need to repeat the selected processing steps when preparing to communicate the protocol-specific packets 310T(1)-310T(N) in the communication signals 306(1)-306(N). As a result, computing resource requirement and processing overhead may be reduced in the communication circuits 304(1)-304(N).

In a receive direction 316, the hardware-based packet processing circuitry 302 receives protocol-specific packets 310R(1)-310R(N) from the communication circuits 304(1)-304(N). The hardware-based packet processing circuitry 302 is configured to process the protocol-specific packets 310R(1)-310R(N) by accelerating selected processing steps (e.g., deciphering, de-compression, checksum, etc.) via the dedicated hardware functional block(s). In this regard, the CPU 308 may not need to repeat the selected processing steps when processing the protocol-specific packets 310R(1)-310R(N). As a result, computing resource requirement and processing overhead may be reduced in the CPU 308.

Figure 4:
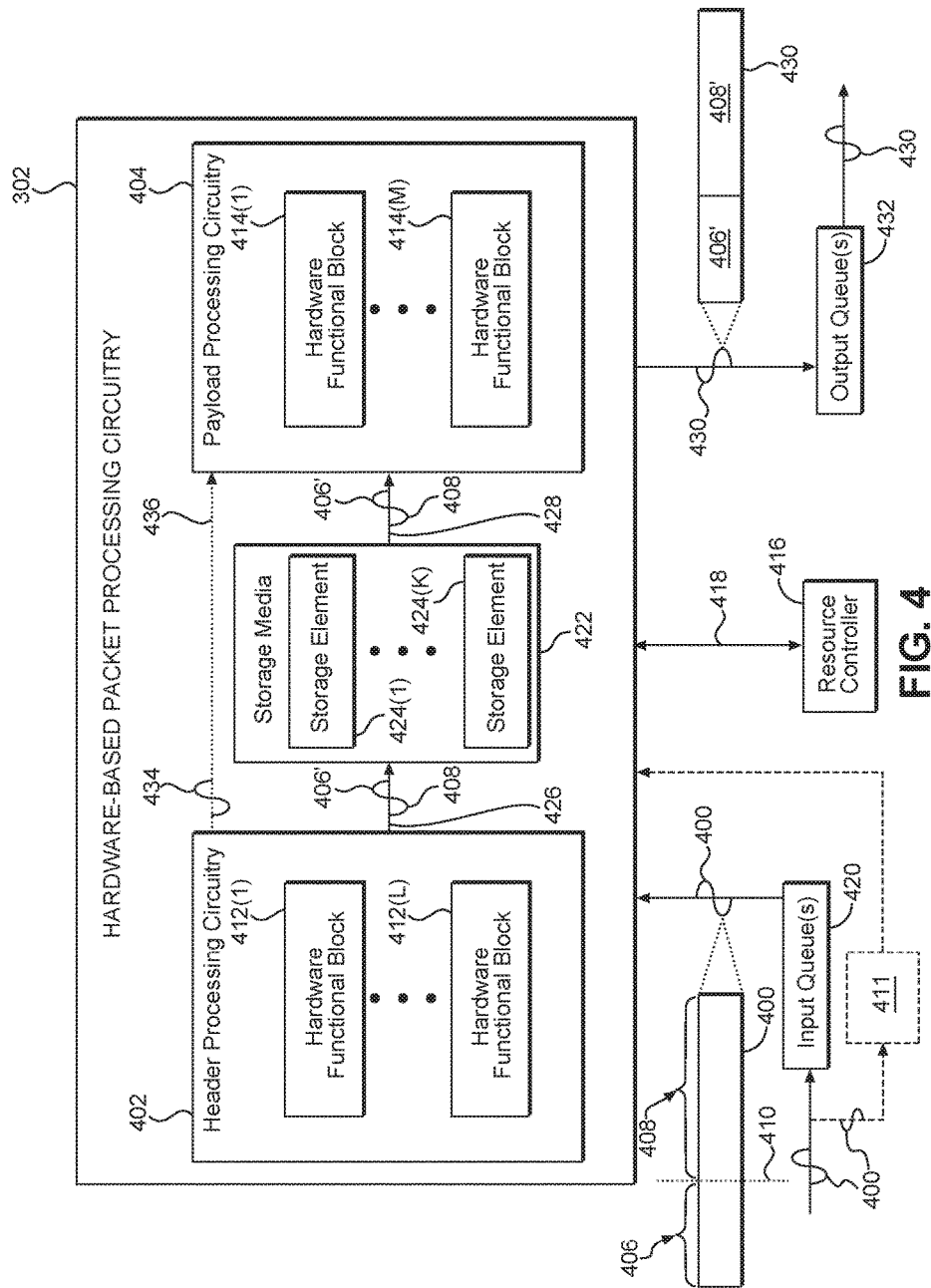
FIG. 4 is a schematic diagram providing an exemplary illustration of the hardware-based packet processing circuitry of FIG. 3 configured to accelerate selected steps of packet processing by processing an incoming packet separately in header processing circuitry and payload processing circuitry.

Specific exemplary aspects of the hardware-based packet processing circuitry 302 are discussed next with reference to FIG. 4. In this regard, FIG. 4 is a schematic diagram providing an exemplary illustration of the hardware-based packet processing circuitry 302 of FIG. 3 configured to accelerate selected steps of packet processing by processing an incoming packet 400 separately in header processing circuitry 402 and payload processing circuitry 404. In a non-limiting example, the header processing circuitry 402 and the payload processing circuitry 404 provide a means for processing a header and a means for processing a payload, respectively. Common elements between FIGS. 1, 3, and 4 are shown therein with common element numbers and will not be re-described herein.

To process the incoming packet 400 separately in the header processing circuitry 402 and the payload processing circuitry 404, the incoming packet 400 is divided into a header portion 406 and a payload portion 408 based on a predefined header threshold 410. As further discussed later, the predefined header threshold 410 may be two hundred fifty-six bytes (256-Byte). As such, the header portion 406 includes the first 256-Byte of the incoming packet 400. In this regard, the header portion 406 and the payload portion 408 are not necessarily divided based on an actual boundary of a specific packet header (e.g., an Ethernet header, an IP header, a TCP/UDP header, etc.). In a first non-limiting example, the hardware-based packet processing circuitry 302 is configured to divide the incoming packet 400 into the header portion 406 and the payload portion 408 based on the predefined header threshold 410. In a second non-limiting example, a splitter module 411 is provided outside the hardware-based packet processing circuitry 302 and communicatively coupled to the hardware-based packet processing circuitry 302. The splitter module 411 receives the incoming packet 400 and splits the incoming packet 400 into the header portion 406 and the payload portion 408 based on the predefined header threshold 410. The splitter module 411 provides the header portion 406 and the payload portion 408 to the header processing circuitry 402 and the payload processing circuitry 404, respectively. The header processing circuitry 402 processes the header portion 406 to generate a processed header portion 406' based on hardware-accelerated header processing elements. The payload processing circuitry 404 processes the payload portion 408 to generate a processed payload portion 408' based on hardware-accelerated payload processing elements. By processing the incoming packet 400 separately in the header processing circuitry 402 and the payload processing circuitry 404 using a hardware-accelerated processing element(s), it is possible to accelerate selected steps (e.g., ciphering/deciphering, compression/de-compression, checksum, etc.) of packet processing, thus reducing computing resource requirements and overhead associated with the software-based packet processing scheme of FIG. 2.

With reference to FIG. 4, the header processing circuitry 402 includes a plurality of first hardware functional blocks 412(1)-412(L). The first hardware functional blocks 412(1)-412(L) are configured to perform a plurality of predefined header processing functions, respectively. In a non-limiting example, the predefined header processing functions include a header deciphering function, a header ciphering function, a header filtering function, a header checksum function, a header cyclic redundancy check (CRC) function, a header compression function, a header de-compression function, a header routing function, and a network address translation (NAT) function.

The payload processing circuitry 404 includes a plurality of second hardware functional blocks 414(1)-414(M). The second hardware functional blocks 414(1)-414(M) are configured to perform a plurality of predefined payload processing functions, respectively. In a non-limiting example, the predefined payload processing functions include a payload deciphering function, a payload ciphering function, a payload checksum function, a payload CRC function, a payload padding calculation function, a payload aggregation function, a payload compression function, and a payload de-compression function.

The hardware-based packet processing circuitry 302 may receive the incoming packet 400 from the CPU 308 (not shown) as one of the protocol-specific packets 310T(1)-310T(N) (not shown). The hardware-based packet processing circuitry 302 may also receive the incoming packet 400 from the communication circuits 304(1)-304(N) (not shown) as one of the protocol-specific packets 310R(1)-310R(N). In this regard, the incoming packet 400 represents any protocol-specific packet the hardware-based packet processing circuitry 302 is configured to receive and process in the electronic device 300 of FIG. 3 (not shown).

The incoming packet 400 is in a first packet format corresponding to the L2 packet 114, the L3 packet 112, or the L4 packet 110 of FIG. 1. As mentioned above, the hardware-based packet processing circuitry 302 divides the incoming packet 400 into the header portion 406 and the payload portion 408 based on the predefined header threshold 410. In a non-limiting example, the predefined header threshold 410 is 256-Byte. As such, the header portion 406 includes the first 256-Byte of the incoming packet 400. Since the incoming packet 400 can be the L2 packet 114, the L3 packet 112, or the L4 packet 110, the header portion 406 may include the L2 packet header 114H, the L3 packet header 112H, or the L4 packet header 110H. In a non-limiting example, the first 256-Byte of the incoming packet 400 includes at least the L2 packet header 114H and the L3 packet header 112H. The first 256-Byte of the incoming packet 400 may include a portion or the entirety of the L4 packet header 110H.

The hardware-based packet processing circuitry 302 is communicatively coupled to a resource controller 416 via a communication path 418. In a non-limiting example, the resource controller 416 can be a network processor 416 embedded in the communication circuits 304(1)-304(N). In this regard, the communication path 418 may be an indirect or a direct communication path between the resource controller 416 and the hardware-based packet processing circuitry 302. In a non-limiting example, the resource controller 416 can be configured to divide the incoming packet 400 into the header portion 406 and the payload portion 408. In another non-limiting example, the resource controller 416 instructs the header processing circuitry 402 to divide the incoming packet 400 into the header portion 406 and the payload portion 408.

The hardware-based packet processing circuitry 302 is configured to process the header portion 406 in one or more selected first hardware functional blocks among the first hardware functional blocks 412(1)-412(L) according to a specified header processing sequence to form the processed header portion 406'. As previously discussed, the first hardware functional blocks 412(1)-412(L) are configured to perform predefined header processing functions. In this regard, the selected first hardware functional blocks are selected based on specific processing requirements of the incoming packet 400. For example, the incoming packet 400 may only require the header checksum function and the header CRC function to be performed on the header portion 406. As such, the hardware-based packet processing circuitry 302 selects the first hardware functional blocks configured to perform the header checksum function and the header CRC function among the first hardware functional blocks 412(1)-412(L) for processing the header portion 406. Further, the specified header processing sequence determines whether the header checksum function is performed ahead of the header CRC function, or vice versa. Hence, the header processing circuitry 402 can be configured to process the header portion 406 to form the processed header portion 406' based on the specific processing requirements of the incoming packet 400.

In a non-limiting example, the resource controller 416 is configured to examine the specific processing requirements of the incoming packet 400 to determine the selected first hardware functional blocks and the specified header processing sequence for processing the header portion 406 in the header processing circuitry 402. The resource controller 416 may associate the incoming packet 400 with an input queue(s) 420. The resource controller 416 may define the selected first hardware functional blocks and the specified header processing sequence for the input queue(s) 420 associated with incoming packet 400. Thus, by retrieving the incoming packet 400 from the input queue(s) 420, the hardware-based packet processing circuitry 302 becomes aware of the selected first hardware functional blocks and the specified header processing sequence.

With continuing reference to FIG. 4, the hardware-based packet processing circuitry 302 includes storage media 422. The storage media 422 includes a plurality of storage elements 424(1)-424(K) (e.g., registers). The header processing circuitry 402 is communicatively coupled to the storage media 422 via a first connection path 426. The first connection path 426 may be a direct connection path or an indirect connection path (e.g., a pointer or indirect physical path) between the header processing circuitry 402 and the storage media 422. In this regard, the header processing circuitry 402 provides the processed header portion 406' and the payload portion 408 to the storage media 422 via the first connection path 426.

The payload processing circuitry 404 is also communicatively coupled to the storage media 422 via a second connection path 428. The second connection path 428 may be a direct connection path or an indirect connection path between the payload processing circuitry 404 and the storage media 422. In this regard, the payload processing circuitry 404 receives the processed header portion 406' and the payload portion 408 from the storage media 422 via the second connection path 428.

The hardware-based packet processing circuitry 302 is configured to process the payload portion 408 in one or more selected second hardware functional blocks among the second hardware functional blocks 414(1)-414(M) according to a specified payload processing sequence to form a processed payload portion 408'. As previously discussed, the second hardware functional blocks 414(1)-414(M) are configured to perform predefined payload processing functions. In this regard, the selected second hardware functional blocks are selected based on the specific processing requirements of the incoming packet 400. For example, the incoming packet 400 may only require the payload checksum function and the payload CRC function to be performed on the payload portion 408. As such, the hardware-based packet processing circuitry 302 selects the second hardware functional blocks configured to perform the payload checksum function and the payload CRC function among the second hardware functional blocks 414(1)-414(M) for processing the payload portion 408. Further, the specified payload processing sequence determines whether the payload checksum function is performed ahead of the payload CRC function, or vice versa. Hence, the payload processing circuitry 404 can be configured to process the payload portion 408 to form the processed payload portion 408' based on the specific processing requirements of the incoming packet 400.

In a non-limiting example, the resource controller 416 is also configured to determine the selected second hardware functional blocks and the specified payload processing sequence for processing the payload portion 408 in the payload processing circuitry 404. The resource controller 416 may also define the selected second hardware functional blocks and the specified payload processing sequence for the input queue(s) 420 associated with incoming packet 400. Thus, by retrieving the incoming packet 400 from the input queue(s) 420, the hardware-based packet processing circuitry 302 becomes aware of the selected second hardware functional blocks and the specified payload processing sequence.

The hardware-based packet processing circuitry 302 is further configured to generate an outgoing packet 430 in a second packet format corresponding to the L2 packet 114, the L3 packet 112, or the L4 packet 110 of FIG. 1. The hardware-based packet processing circuitry 302 generates the outgoing packet 430 based on the processed header portion 406' and the processed payload portion 408' of the incoming packet 400. In a first non-limiting example, the outgoing packet 430 includes only the processed header portion 406' without the processed payload portion 408'. In a second non-limiting example, the outgoing packet 430 includes both the processed header portion 406' and the processed payload portion 408'. The hardware-based packet processing circuitry 302 may add the outgoing packet 430 into an output queue(s) 432. In a non-limiting example, the output queue(s) 432 is associated with a packet destination determined by resource controller 416. In another non-limiting example, a first hardware functional block among the first hardware functional blocks 412(1)-412(L), which is configured to perform the header routing function, can determine the packet destination of the outgoing packet 430. As illustrated later with reference to FIGS. 6 and 7, the output queue(s) 432 can be configured to route the outgoing packet 430 to the CPU 308 and/or any of the communication circuits 304(1)-304(N) of FIG. 3. In a non-limiting example, the hardware-based packet processing circuitry 302 can be configured to place a smaller outgoing packet (e.g., the outgoing packet 430 with only the processed header portion 406') ahead of a larger outgoing packet (e.g., the outgoing packet 430 with both the processed header portion 406' and the processed payload portion 408' and/or packets from different input streams/queues (not shown)), thus helping mitigate head-of-line (HOL) blocking in the output queue(s) 432.

The hardware-based packet processing circuitry 302 is configured to process the incoming packet 400 to generate the outgoing packet 430 based on a process. In this regard, FIG. 5 is a flowchart of exemplary packet processing process 500 that may be performed by the hardware-based packet processing circuitry 302 of FIGS. 3 and 4.

Figure 5:
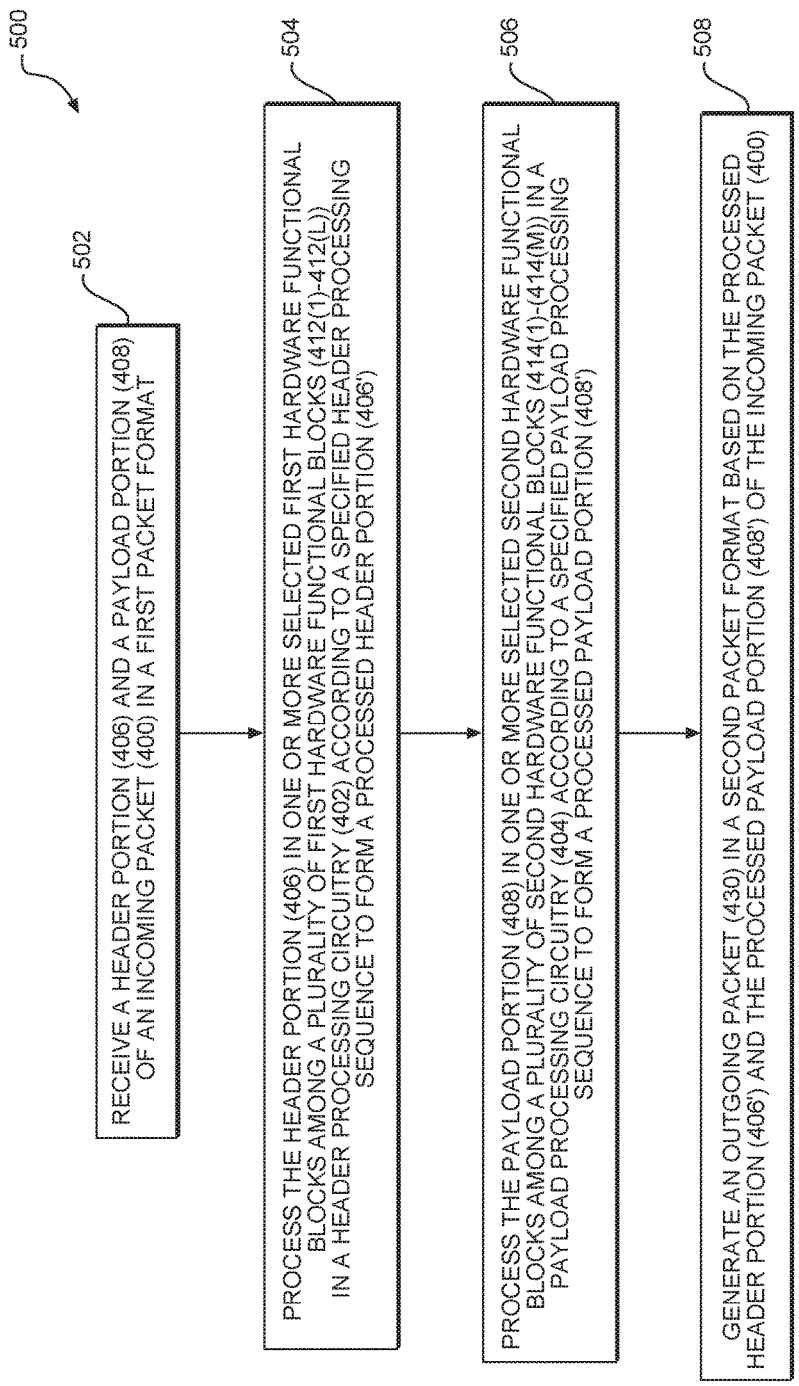
FIG. 5 is a flowchart of exemplary process for packet processing that may be performed by the hardware-based packet processing circuitry of FIGS. 3 and 4.

With reference to FIG. 5, the hardware-based packet processing circuitry 302 receives the header portion 406 and the payload portion 408 of the incoming packet 400 in the first packet format (block 502). The hardware-based packet processing circuitry 302 processes the header portion 406 in the one or more selected first hardware functional blocks among the first hardware functional blocks 412(1)-412(L) in the header processing circuitry 402 according to the specified header processing sequence to form the processed header portion 406' (block 504). The hardware-based packet processing circuitry 302 processes the payload portion 408 in the one or more selected second hardware functional blocks among the second hardware functional blocks 414(1)-414(M) in the payload processing circuitry 404 according to the specified payload processing sequence to form the processed payload portion 408' (block 506). The hardware-based packet processing circuitry 302 generates the outgoing packet 430 in the second packet format based on the processed header portion 406' and the processed payload portion 408' of the incoming packet 400 (block 508).

With reference back to FIG. 4, the header processing circuitry 402 is configured to generate and provide metadata 434 to the payload processing circuitry 404 via a metadata communication link 436. The metadata 434 conveys selected processing information related to the processed header portion 406' to the payload processing circuitry 404. As such, the payload processing circuitry 404 may utilize the selected processing information related to the processed header portion 406' to facilitate and/or streamline processes on the payload portion 408. Specific exemplary aspects of the metadata 434 are discussed next.

In a non-limiting example, the metadata 434 includes a decipher initiation vector the header processing circuitry 402 uses to decipher the header portion 406. In this regard, the payload processing circuitry 404 can decipher the payload portion 408 based on the decipher initiation vector for the header portion 406. Likewise, the metadata 434 includes cipher initiation vector the header processing circuitry 402 uses to cipher the header portion 406. In this regard, the payload processing circuitry 404 can cipher the payload portion 408 based on the cipher initiation vector for the header portion 406.

In another non-limiting example, the metadata 434 includes a compression dictionary and state the header processing circuitry 402 uses to compress the header portion 406. In this regard, the payload processing circuitry 404 can compress the payload portion 408 based on the compression dictionary and state for the header portion 406. Likewise, the metadata 434 includes de-compression dictionary and state the header processing circuitry 402 uses to de-compress the header portion 406. In this regard, the payload processing circuitry 404 can de-compress the payload portion 408 based on the de-compression dictionary and state for the header portion 406.

In another non-limiting example, the metadata 434 includes a header checksum the header processing circuitry 402 uses to perform a header checksum for the header portion 406. In this regard, the payload processing circuitry 404 can perform a payload checksum on the payload portion 408 based on the header checksum for the header portion 406.

In another non-limiting example, the metadata 434 includes a partial CRC the header processing circuitry 402 uses to perform CRC for the header portion 406. In this regard, the payload processing circuitry 404 can perform CRC on the payload portion 408 based on the partial CRC for the header portion 406.

With continuing reference to FIG. 4, the first packet format may be the same or different from the second packet format. In a non-limiting example, the first packet format can be an IPv4 packet format, an IPv6 packet format, an Ethernet packet format, a USB packet format, and a PCIe packet format. Likewise, the second packet format can also be an IPv4 packet format, an IPv6 packet format, an Ethernet packet format, a USB packet format, and a PCIe packet format. In this regard, in a non-limiting example, the resource controller 416 can also configure the input queue(s) 420 associated with the incoming packet 400 to indicate the second packet format of the outgoing packet 430. Accordingly, the header processing circuitry 402 is able to determine that the first packet format of the incoming packet 400 is different from the second packet format of the outgoing packet 430 based on an indication provided by the input queue(s) 420. In response to determining that the first packet format is different from the second packet format, the header processing circuitry 402 can be configured to convert the first packet format into the second packet format in the processed header portion 406'.

Figure 6:
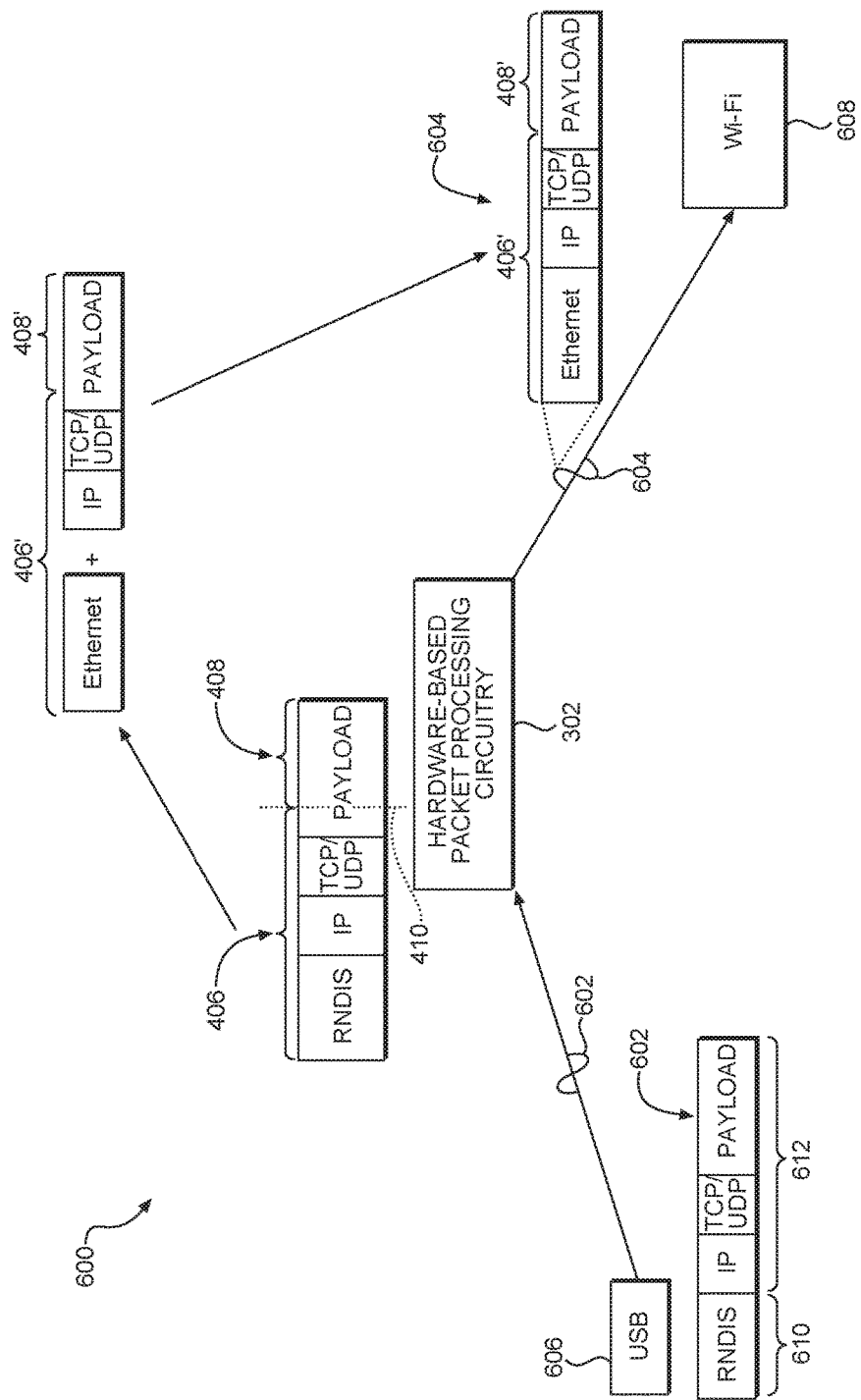
FIG. 6 is a schematic diagram of an exemplary electronic device in which the hardware-based packet processing circuitry of FIGS. 3 and 4 is configured to convert an incoming universal serial bus (USB) packet into an outgoing Ethernet packet.

In this regard, FIG. 6 is a schematic diagram of an exemplary electronic device 600 in which the hardware-based packet processing circuitry 302 of FIGS. 3 and 4 is configured to convert an incoming USB packet 602 into an outgoing Ethernet packet 604. Common elements between FIGS. 3, 4, and 6 are shown therein with common element numbers and will not be re-described herein.

With reference to FIG. 6, the hardware-based packet processing circuitry 302 receives the incoming USB packet 602, which is equivalent to the incoming packet 400 of FIG. 4, in the USB packet format (the first packet format) from a USB circuit 606. The hardware-based packet processing circuitry 302 is configured to generate the outgoing Ethernet packet 604, which is equivalent to the outgoing packet 430 of FIG. 4, in the Ethernet packet format (the second packet format) to provide to a Wi-Fi circuit 608. In this regard, the hardware-based packet processing circuitry 302 is configured to convert the USB packet format into the Ethernet packet format.

In a non-limiting example, the incoming USB packet 602 includes a header 610 and an IP payload 612. In a non-limiting example, the header 610 can be a Remote Network Driver Interface Specification (RNDIS) header, a Mobile Broadband Interface Model (MBIM) header, or a proprietary header. The hardware-based packet processing circuitry 302 divides the incoming USB packet 602 into the header portion 406 and the payload portion 408 based on the predefined header threshold 410. In a non-limiting example, the header portion 406 includes an RNDIS header, an IP header, a TCP/UDP header, and partial payload of the incoming USB packet 602. Accordingly, the payload portion 408 includes the remainder of the incoming USB packet 602. The hardware-based packet processing circuitry 302 processes the header portion 406 to form the processed header portion 406' in the Ethernet packet format. The hardware-based packet processing circuitry 302 also processes the payload portion 408 to form the processed payload portion 408'. In this regard, the processed payload portion 408' is the same as the payload portion 408. The hardware-based packet processing circuitry 302 assembles the outgoing Ethernet packet 604 based on the processed header portion 406' and the processed payload portion 408'. As a result, the hardware-based packet processing circuitry 302 converts the incoming USB packet 602 into the outgoing Ethernet packet 604.

With reference back to FIG. 3, in the transmit direction 314, the hardware-based packet processing circuitry 302 may receive the incoming packet 400 of FIG. 4 from the CPU 308 in any of the protocol-specific packets 310T(1)-310T(N). The hardware-based packet processing circuitry 302 may provide the outgoing packet 430 of FIG. 4 to the CPU 308 and/or any of the communication circuits 304(1)-304(N) in any of the protocol-specific packets 310T(1)-310T(N). The protocol-specific packets 310T(1)-310T(N) may be in the Ethernet packet format, the IPv4 packet format, the IPv6 packet format, the USB packet format, or the PCIe packet format. In the receive direction 316, the hardware-based packet processing circuitry 302 may receive the incoming packet 400 from the communication circuits 304(1)-304(N) in any of the protocol-specific packets 310R(1)-310R(N). The hardware-based packet processing circuitry 302 may provide the outgoing packet 430 to the CPU 308 and/or any of the communication circuits 304(1)-304(N) in any of the protocol-specific packets 310R(1)-310R(N). The protocol-specific packets 310R(1)-310R(N) may be in the Ethernet packet format, the IPv4 packet format, the IPv6 packet format, the USB packet format, or the PCIe packet format.

In a non-limiting example, the communication circuit 304(1) is a Wi-Fi circuit 304(1) configured to support the layer 102(1) of FIG. 1. In this regard, in the transmit direction 314, the hardware-based packet processing circuitry 302 is configured receive the incoming packet 400 from the CPU 308 in the Ethernet packet format, and provide the outgoing packet 430 to the Wi-Fi circuit 304(1) in the Ethernet packet format. Likewise, in the receive direction 316, the hardware-based packet processing circuitry 302 is configured receive the incoming packet 400 from the Wi-Fi circuit 304(1) in the Ethernet packet format, and provide the outgoing packet 430 to the CPU 308 in the Ethernet packet format.

In another non-limiting example, the Wi-Fi circuit 304(1) is configured to support both the layer 102(1) and the layer 102(2) of FIG. 1. In this regard, in the transmit direction 314, the hardware-based packet processing circuitry 302 is configured receive the incoming packet 400 from the CPU 308 in the IPv4 packet format or the IPv6 packet format, and provide the outgoing packet 430 to the Wi-Fi circuit 304(1) in the IPv4 packet format or the IPv6 packet format. Likewise, in the receive direction 316, the hardware-based packet processing circuitry 302 is configured receive the incoming packet 400 from the Wi-Fi circuit 304(1) in the IPv4 packet format or the IPv6 packet format, and provide the outgoing packet 430 to the CPU 308 in the IPv4 packet format or the IPv6 packet format.

In another non-limiting example, the communication circuit 304(2) is an LTE circuit 304(2) configured to support both the layer 102(1) and the layer 102(2) of FIG. 1. In this regard, in the transmit direction 314, the hardware-based packet processing circuitry 302 is configured receive the incoming packet 400 from the CPU 308 in the IPv4 packet format or the IPv6 packet format, and provide the outgoing packet 430 to the LTE circuit 304(2) in the IPv4 packet format or the IPv6 packet format. Likewise, in the receive direction 316, the hardware-based packet processing circuitry 302 is configured receive the incoming packet 400 from the LTE circuit 304(2) in the IPv4 packet format or the IPv6 packet format, and provide the outgoing packet 430 to the CPU 308 in the IPv4 packet format or the IPv6 packet format.

In another non-limiting example, the communication circuit 304(3) is a USB circuit 304(3) configured to support the layer 102(1) of FIG. 1 only. In this regard, in the transmit direction 314, the hardware-based packet processing circuitry 302 is configured receive the incoming packet 400 from the CPU 308 in the USB packet format, and provide the outgoing packet 430 to the USB circuit 304(3) in the USB packet format. Likewise, in the receive direction 316, the hardware-based packet processing circuitry 302 is configured receive the incoming packet 400 from the USB circuit 304(3) in the USB packet format, and provide the outgoing packet 430 to the CPU 308 in the USB packet format.

In another non-limiting example, the communication circuit 304(N) is a PCIe circuit 304(N) configured to support the layer 102(1) of FIG. 1 only. In this regard, in the transmit direction 314, the hardware-based packet processing circuitry 302 is configured receive the incoming packet 400 from the CPU 308 in the PCIe packet format, and provide the outgoing packet 430 to the PCIe circuit 304(N) in the PCIe packet format. Likewise, in the receive direction 316, the hardware-based packet processing circuitry 302 is configured receive the incoming packet 400 from the PCIe circuit 304(N) in the PCIe packet format, and provide the outgoing packet 430 to the CPU 308 in the PCIe packet format.

According to the non-limiting examples discussed above, the hardware-based packet processing circuitry 302 can be configured to receive the incoming packet 400 from a selected packet source among the CPU 308 and the communication circuits 304(1)-304(N). Similarly, the hardware-based packet processing circuitry 302 is configured to provide the outgoing packet 430 to a selected packet destination among the CPU 308 and the communication circuits 304(1)-304(N). As such, the hardware-based packet processing circuitry 302 is configured to enable packet exchange among the CPU 308 and the communication circuits 304(1)-304(N).

Figure 7:
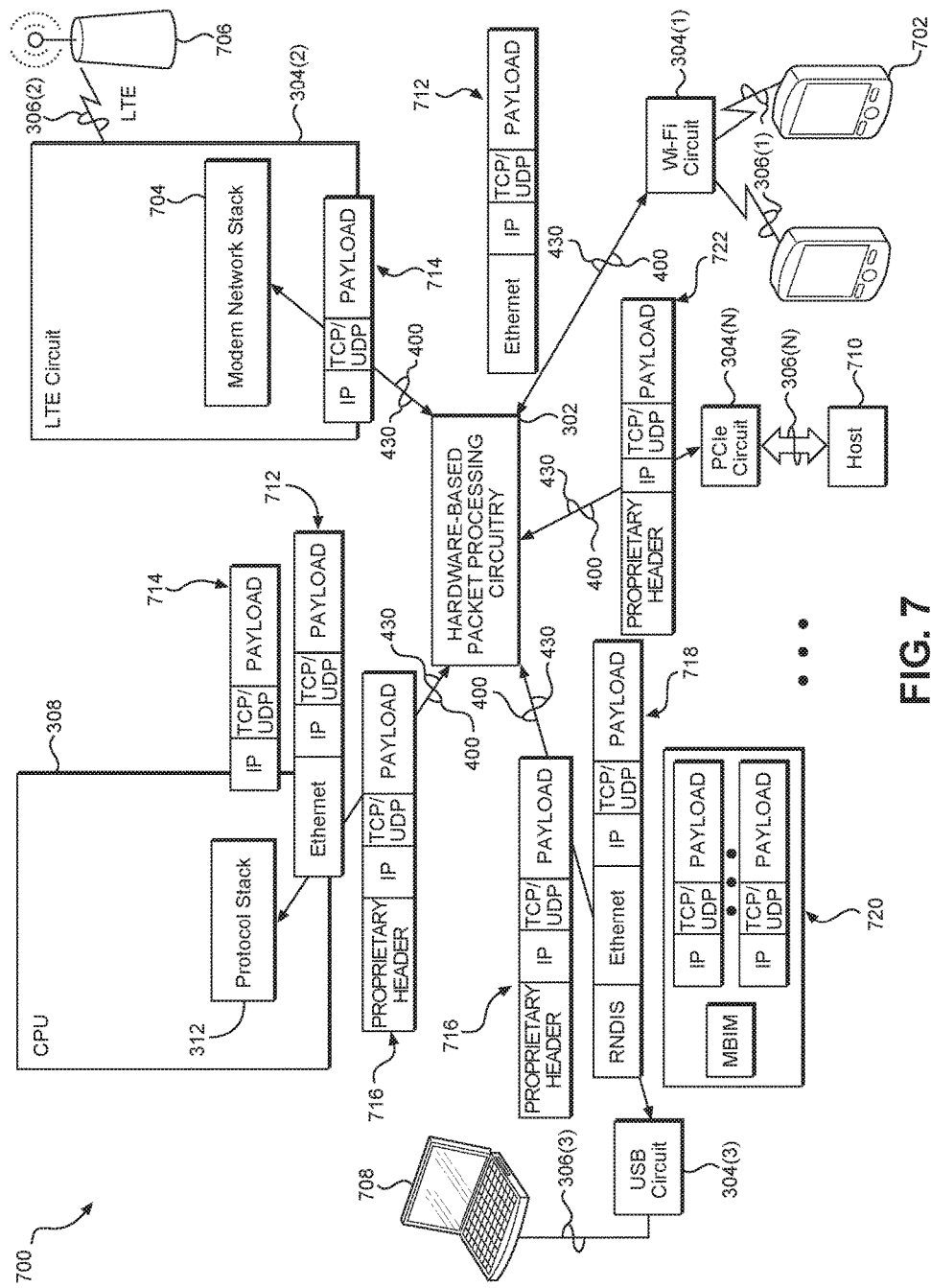
FIG. 7 is a schematic diagram of an exemplary electronic device in which the hardware-based packet processing circuitry of FIGS. 3 and 4 is configured to enable packet exchange among a central processing unit (CPU) and a plurality of communication circuits in the electronic device.

In this regard, FIG. 7 is a schematic diagram of an exemplary electronic device 700 in which the hardware-based packet processing circuitry 302 of FIGS. 3 and 4 is configured to enable packet exchange among the CPU 308 and the communication circuits 304(1)-304(N) in the electronic device 700. Common elements between FIGS. 1, 3, and 7 are shown therein with common element numbers and will not be re-described herein.

With reference to FIG. 7, the CPU 308 includes the communication protocol stack 312. In a non-limiting example, the communication protocol stack 312 is configured to support the layers 102(2)-102(7) of FIG. 1. The Wi-Fi circuit 304(1) is configured to communicate the communication signal 306(1) to one or more Wi-Fi client devices 702. The LTE circuit 304(2) includes a modem network stack 704. In a non-limiting example, the modem network stack 704 is configured to support the layers 102(1), 102(2) of FIG. 1. The LTE circuit 304(2) is configured to communicate the communication signal 306(2) with an LTE base transceiver station (BTS) 706. The USB circuit 304(3) is configured to support the layer 102(1) of FIG. 1. The USB circuit 304(3) is configured to communicate the communication signal 306(3) with a USB device 708. The PCIe circuit 304(N), which may be a PCIe endpoint for example, is configured to communicate the communication signal 306(N) with a PCIe host 710. The PCIe circuit 304(N) is configured to support the layer 102(1) of FIG. 1.

The hardware-based packet processing circuitry 302 can receive the incoming packet 400 from the Wi-Fi circuit 304(1) in an Ethernet packet format 712. In a first non-limiting example, the hardware-based packet processing circuitry 302 generates the outgoing packet 430 also in the Ethernet packet format 712. Accordingly, the hardware-based packet processing circuitry 302 provides the outgoing packet 430 to the CPU 308 or back to the Wi-Fi circuit 304(1). In a second non-limiting example, the hardware-based packet processing circuitry 302 generates the outgoing packet 430 in an IP packet format (e.g., IPv4 or IPv6 packet format) 714 based on the incoming packet 400 in the Ethernet packet format 712. Accordingly, the hardware-based packet processing circuitry 302 provides the outgoing packet 430 to the CPU 308 and/or the LTE circuit 304(2). In a third non-limiting example, the hardware-based packet processing circuitry 302 generates the outgoing packet 430 in a first USB packet format 716 based on the incoming packet 400 in the Ethernet packet format 712. Accordingly, the hardware-based packet processing circuitry 302 provides the outgoing packet 430 to the CPU 308 and/or the USB circuit 304(3). In a fourth non-limiting example, the hardware-based packet processing circuitry 302 generates the outgoing packet 430 in a second USB packet format 718 based on the incoming packet 400 in the Ethernet packet format 712. Accordingly, the hardware-based packet processing circuitry 302 provides the outgoing packet 430 to the USB circuit 304(3). In a fifth non-limiting example, the hardware-based packet processing circuitry 302 generates the outgoing packet 430 in a third USB packet format 720 based on the incoming packet 400 in the Ethernet packet format 712. Accordingly, the hardware-based packet processing circuitry 302 provides the outgoing packet 430 to the USB circuit 304(3). In a sixth non-limiting example, the hardware-based packet processing circuitry 302 generates the outgoing packet 430 in a PCIe packet format 722 based on the incoming packet 400 in the Ethernet packet format 712. Accordingly, the hardware-based packet processing circuitry 302 provides the outgoing packet 430 to the PCIe circuit 304(N). It shall be appreciated that the non-limiting examples discussed above with reference to the Wi-Fi circuit 304(1) are applicable to any of the communication circuits 304(2)-304(N), including the LTE circuit 304(2), the USB circuit 304(3), and the PCIe circuit 304(N).

Hardware-based packet processing circuitry according to aspects disclosed herein may be provided in or integrated into any processor-based device, such as the electronic device 300 of FIG. 3. Examples, without limitation, include a navigation device, a communications device, a mobile location data unit, a mobile phone, a cellular phone, a smart phone, a tablet, a phablet, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile. It shall be noted that the hardware-based packet processing circuitry 302 of FIGS. 2 and 3 is not intended to be provided in a server and/or an Internet router.

Figure 8:
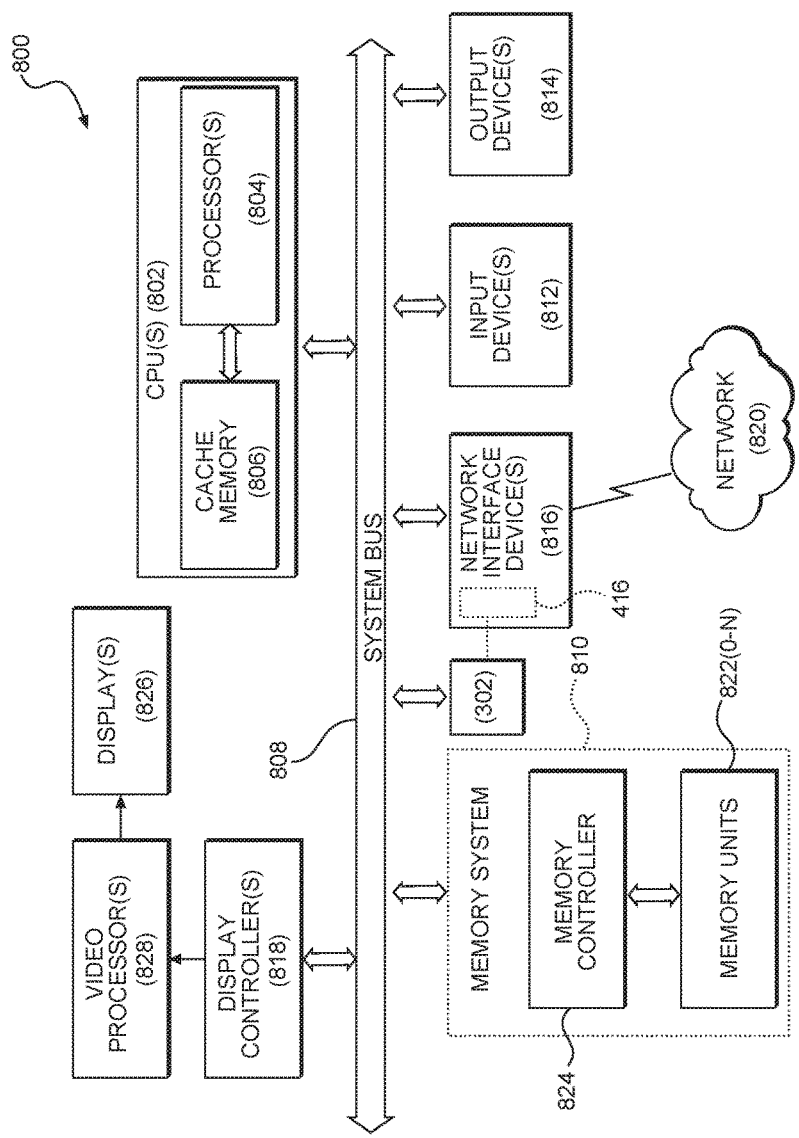
FIG. 8 illustrates an example of a processor-based system that can support the hardware-based packet processing circuitry of FIGS. 3 and 4.

In this regard, FIG. 8 illustrates an example of a processor-based system 800 that can support the hardware-based packet processing circuitry 302 of FIGS. 3 and 4. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808. As is well known, the CPU(s)

802 communicates with other devices by exchanging address, control, and data information over the system bus 808. Although not illustrated in FIG. 8, multiple system buses 808 could be provided, wherein each system bus 808 constitutes a different fabric.

Other master and slave devices can be connected to the system bus 808. As illustrated in FIG. 8, these devices can include a memory system 810, one or more input devices 812, one or more output devices 814, one or more network interface devices 816, and one or more display controllers 818, as examples. The input device(s) 812 can include any type of input device, including, but not limited to, input keys, switches, voice processors, etc. The output device(s) 814 can include any type of output device, including, but not limited to, audio, video, other visual indicators, etc. The network interface device(s) 816 can be any device configured to allow exchange of data to and from a network 820. The network interface device(s) 816 can include the network processor 416 of FIG. 4 that is configured to function as the resource controller 416. The network 820 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 816 can be configured to support any type of communications protocol desired. The memory system 810 can include one or more memory units 822(0-N) and a memory controller 824.

The CPU(s) 802 may also be configured to access the display controller(s) 818 over the system bus 808 to control information sent to one or more displays 826. The display controller(s) 818 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. Hardware-based packet processing circuitry, comprising:
    header processing circuitry comprising a plurality of first hardware functional blocks configured to perform a plurality of predefined header processing functions, respectively; and
    payload processing circuitry comprising a plurality of second hardware functional blocks configured to perform a plurality of predefined payload processing functions, respectively;
    wherein the hardware-based packet processing circuitry is configured to:
        receive a header portion and a payload portion of an incoming packet in a first packet format;
        process the header portion in one or more selected first hardware functional blocks among the plurality of first hardware functional blocks according to a specified header processing sequence to form a processed header portion;
process the payload portion in one or more selected second hardware functional blocks among the plurality of second hardware functional blocks according to a specified payload processing sequence to form a processed payload portion; and
generate an outgoing packet in a second packet format based on the processed header portion and the processed payload portion of the incoming packet.

2. The hardware-based packet processing circuitry of claim 1, wherein the header processing circuitry is configured to generate metadata related to the processed header portion and provide the metadata to the payload processing circuitry.

3. The hardware-based packet processing circuitry of claim 2, wherein:
the metadata comprises a decipher initiation vector of the header portion; and
the payload processing circuitry is configured to decipher the payload portion based on the decipher initiation vector for the header portion.

4. The hardware-based packet processing circuitry of claim 2, wherein:
the metadata comprises a cipher initiation vector of the header portion; and
the payload processing circuitry is configured to cipher the payload portion based on the cipher initiation vector for the header portion.

5. The hardware-based packet processing circuitry of claim 2, wherein:
the metadata comprises a compression dictionary and state of the header portion; and
the payload processing circuitry is configured to compress the payload portion based on the compression dictionary and state for the header portion.

6. The hardware-based packet processing circuitry of claim 2, wherein:
the metadata comprises a de-compression dictionary and state of the header portion; and
the payload processing circuitry is configured to decompress the payload portion based on the de-compression dictionary and state for the header portion.

7. The hardware-based packet processing circuitry of claim 2, wherein:
the metadata comprises a header checksum of the header portion; and
the payload processing circuitry is configured to perform a payload checksum on the payload portion based on the header checksum for the header portion.

8. The hardware-based packet processing circuitry of claim 2, wherein:
the metadata comprises a partial cyclic redundancy check (CRC) of the header portion; and
the payload processing circuitry is configured to perform CRC on the payload portion based on the partial CRC for the header portion.

9. The hardware-based packet processing circuitry of claim 1, further configured to receive and divide the incoming packet into the header portion and the payload portion based on a predefined header threshold.

10. The hardware-based packet processing circuitry of claim 9, wherein:
the predefined header threshold is two hundred fifty-six bytes; and
the header portion comprises first two hundred fifty-six bytes of the incoming packet.

11. The hardware-based packet processing circuitry of claim 1, further configured to receive the header portion and the payload portion from a splitter module communicatively coupled to the hardware-based packet processing circuitry, the splitter module configured to divide the incoming packet into the header portion and the payload portion based on a predefined header threshold.

12. The hardware-based packet processing circuitry of claim 1, configured to generate the outgoing packet comprising the processed header portion.

13. The hardware-based packet processing circuitry of claim 1, configured to generate the outgoing packet comprising the processed header portion and the processed payload portion.

14. The hardware-based packet processing circuitry of claim 1, configured to receive the incoming packet in the first packet format selected from the group consisting of: an Internet Protocol (IP) version four (IPv4) packet format; an IP version six (IPv6) packet format; an Ethernet packet format; a universal serial bus (USB) packet format; and a peripheral component interconnect express (PCIe) packet format.

15. The hardware-based packet processing circuitry of claim 1, configured to generate the outgoing packet in the second packet format selected from the group consisting of: an Internet Protocol (IP) version four (IPv4) packet format; an IP version six (IPv6) packet format; an Ethernet packet format; a universal serial bus (USB) packet format; and a peripheral component interconnect express (PCIe) packet format.

16. The hardware-based packet processing circuitry of claim 1, wherein the header processing circuitry is further configured to:
determine that the first packet format of the incoming packet is different from the second packet format of the outgoing packet; and
convert the first packet format into the second packet format in the processed header portion in response to determining that the first packet format is different from the second packet format.

17. The hardware-based packet processing circuitry of claim 1, wherein the plurality of first hardware functional blocks is configured to perform the plurality of predefined header processing functions selected from the group consisting of: a header deciphering function; a header ciphering function; a header filtering function; a header checksum function; a header cyclic redundancy check (CRC) function; a header compression function; a header de-compression function; a header routing function; and a network address translation (NAT) function.

18. The hardware-based packet processing circuitry of claim 1, wherein the plurality of second hardware functional blocks is configured to perform the plurality of predefined payload processing functions selected from the group consisting of: a payload deciphering function; a payload ciphering function; a payload checksum function; a payload cyclic redundancy check (CRC) function; a payload padding calculation function; a payload aggregation function; a payload compression function; and a payload de-compression function.

19. An apparatus means for processing packets, comprising:
a means for processing a header comprising a plurality of first hardware functional blocks configured to perform a plurality of predefined header processing functions, respectively; and a means for processing a payload comprising a plurality of second hardware functional blocks configured to perform a plurality of predefined payload processing functions, respectively;

wherein the means for processing the packets is configured to:

receive a header portion and a payload portion of an incoming packet in a first packet format;

process the header portion in one or more selected first hardware functional blocks among the plurality of first hardware functional blocks according to a specified header processing sequence to form a processed header portion;

process the payload portion in one or more selected second hardware functional blocks among the plurality of second hardware functional blocks according to a specified payload processing sequence to form a processed payload portion; and generate an outgoing packet in a second packet format based on the processed header portion and the processed payload portion of the incoming packet.

20. A method for processing packets, comprising:

receiving a header portion and a payload portion of an incoming packet in a first packet format;

processing the header portion in one or more selected first hardware functional blocks among a plurality of first hardware functional blocks in header processing circuitry according to a specified header processing sequence to form a processed header portion;

processing the payload portion in one or more selected second hardware functional blocks among a plurality of second hardware functional blocks in payload processing circuitry according to a specified payload processing sequence to form a processed payload portion; and generating an outgoing packet in a second packet format based on the processed header portion and the processed payload portion of the incoming packet.

21. The method of claim 20, further comprising:

receiving metadata comprising a decipher initiation vector of the header portion; and deciphering the payload portion based on the decipher initiation vector for the header portion.

22. The method of claim 20, further comprising:

receiving metadata comprising a cipher initiation vector of the header portion; and ciphering the payload portion based on the cipher initiation vector for the header portion.

23. The method of claim 20, further comprising:

receiving metadata comprising a compression dictionary and state of the header portion; and compressing the payload portion based on the compression dictionary and state for the header portion.

24. The method of claim 20, further comprising:

receiving metadata comprising a de-compression dictionary and state of the header portion; and de-compressing the payload portion based on the de-compression dictionary and state for the header portion.

25. The method of claim 20, further comprising:

receiving metadata comprising a header checksum of the header portion; and performing a payload checksum on the payload portion based on the header checksum for the header portion.

26. The method of claim 20, further comprising:

receiving metadata comprising a partial cyclic redundancy check (CRC) of the header portion; and performing CRC on the payload portion based on the partial CRC for the header portion.

27. The method of claim 20, further comprising generating the outgoing packet comprising the processed header portion.

28. The method of claim 20, further comprising generating the outgoing packet comprising the processed header portion and the processed payload portion.

29. The method of claim 20, further comprising:

determining that the first packet format of the incoming packet is different from the second packet format of the outgoing packet; and converting the first packet format into the second packet format in the processed header portion in response to determining that the first packet format is different from the second packet format.

30. An electronic device, comprising:

one or more communication circuits configured to communicate one or more communication signals based on respective communication protocols;

a central processing unit (CPU) configured to process protocol-specific packets associated with the one or more communication signals based on a communication protocol stack; and hardware-based packet processing circuitry, comprising:

header processing circuitry comprising a plurality of first hardware functional blocks configured to perform a plurality of predefined header processing functions, respectively; and payload processing circuitry comprising a plurality of second hardware functional blocks configured to perform a plurality of predefined payload processing functions, respectively;

wherein the hardware-based packet processing circuitry is configured to:

receive a header portion and a payload portion of an incoming packet in a first packet format from a selected packet source among the CPU and the one or more communication circuits;

process the header portion in one or more selected first hardware functional blocks among the plurality of first hardware functional blocks according to a specified header processing sequence to form a processed header portion;

generate metadata related to the processed header portion;

process the payload portion based on the metadata in one or more selected second hardware functional blocks among the plurality of second hardware functional blocks according to a specified payload processing sequence to form a processed payload portion;

generate an outgoing packet in a second packet format based on the processed header portion and the processed payload portion of the incoming packet; and provide the outgoing packet to a selected packet destination among the CPU and the one or more communication circuits.

* * * * *

UNITED STATES PATENT AND TRADEMARK OFFICE
CERTIFICATE OF CORRECTION

PATENT NO. : 9,998,573 B2
APPLICATION NO. : 15/226429
DATED : June 12, 2018
INVENTOR(S) : Tomer Rafael Ben-Chen et al.

Page 1 of 1

It is certified that error appears in the above-identified patent and that said Letters Patent is hereby corrected as shown below:

Claim 19, at Column 20, Line 62, change "An apparatus means for" to --A means for--.

Signed and Sealed this
Thirteenth Day of November, 2018

Andrei Iancu
*Director of the United States Patent and Trademark Office*